(12) United States Patent
Takemura

(10) Patent No.: US 7,891,714 B2
(45) Date of Patent: Feb. 22, 2011

(54) STRUCTURE OF REAR BUMPER COVER

(75) Inventor: Kazuya Takemura, Kariya (JP)

(73) Assignee: Toyota Shatai Kabushiki Kaisha, Kariya-shi (JP)

( * ) Notice: Subject to any disclaimer, the term of this patent is extended or adjusted under 35 U.S.C. 154(b) by 291 days.

(21) Appl. No.: 12/168,353

(22) Filed: Jul. 7, 2008

(65) Prior Publication Data

US 2009/0039618 A1 Feb. 12, 2009

(30) Foreign Application Priority Data

Aug. 9, 2007 (JP) ............................. 2007-208304

(51) Int. Cl.
*B60R 19/02* (2006.01)
(52) U.S. Cl. ...................... 293/117; 280/507
(58) Field of Classification Search ................ 293/117, 293/113, 155; 280/507
See application file for complete search history.

(56) References Cited

U.S. PATENT DOCUMENTS 4,109,930 A * 8/1978 Pilhall ...................... 280/491.4
6,581,955 B2 * 6/2003 Aquinto et al. ............. 280/500
6,719,318 B1 * 4/2004 Blake ......................... 280/507
6,874,806 B1 * 4/2005 Blake ......................... 280/507

FOREIGN PATENT DOCUMENTS

JP 10-329629 12/1998

* cited by examiner

*Primary Examiner*—Patricia L Engle
(74) *Attorney, Agent, or Firm*—Oblon, Spivak, McClelland, Maier & Neustadt, L.L.P.

(57) ABSTRACT

An object of the invention is to provide a structure of a rear bumper cover capable of improving appearance and rigidity of the rear bumper cover. A rear bumper cover made from a resin disposed in the backward part of the vehicle forms an opening portion at the position of attachment of a tow hook. In the opening portion, a cover attaching member made from a resin which has a member opening hole capable of leaving the tow hook open is disposed with the state of covering whole the outer edge of the opening portion. On the cover attaching member, a hook cover capable of covering whole a member opening hole is detachably attached.

6 Claims, 10 Drawing Sheets

STRUCTURE OF REAR BUMPER COVER

CROSS-REFERENCES TO RELATED APPLICATIONS

The present application claims priority under 35 U.S.C. §119 to Japanese Application No. 2007-208304, filed Aug. 9, 2007, entitled "STRUCTURE OF REAR BUMPER COVER". The contents of this application are incorporated herein by reference in their entirety.

BACKGROUND OF THE INVENTION

1. Field of the Invention

The present invention relates to a structure which forms an opening portion at the position of a tow hook at a rear bumper cover made from a resin in backward of a vehicle.

2. Background of the Invention

In the backward part of the vehicle, such as passenger automobile, the tow hook is disposed, for example, the opening portion is disposed on the rear bumper cover, and the structure which leaves the tow hook open from this opening portion is employed. In addition, attaching structure of the tow hook cover in Patent Document 1, for example, the opening portion for the tow hook is formed on the bumper. Moreover, since the tow hook cover is attached on this opening portion to be opened and closed universally, the tow hook can be used without removing the tow hook cover from the bumper.

However, when forming the opening portion on the rear bumper cover made from a resin, not only an appearance is bad, but also rigidity of the rear bumper cover is lowered. Therefore, in order to dispose the tow hook at the position of the rear bumper cover with keeping good appearance and high rigidity, further effort is needed.

Patent Document 1: JP 10-329629 Unexamined Patent Publication (Kokai)

DISCLOSURE OF INVENTION

Problems to be Solved by the Invention

The present invention has been made in consideration of such conventional problems, and an object of the present invention is to provide a structure of a rear bumper cover capable of improving appearance and rigidity of the rear bumper cover.

Means of Solving the Problems

The present invention relates to a structure of a rear bumper cover made from a resin, disposed in the backward part of a vehicle, and comprising an opening portion formed at a position of a tow hook, the structure comprising:

a cover attaching member made from a resin having a member opening hole capable of leaving the tow hook open, the cover attaching member disposed on the opening portion of the rear bumper cover with the state of covering whole the outer edge of the opening portion, and a hook cover capable of covering whole the member opening hole, the hook cover detachably attached on the cover attaching member.

In the structure of the rear bumper cover of the present invention, a cover attaching member made from a resin is disposed on an opening portion formed on a rear bumper cover made from a resin. The cover attaching member is disposed with the state of covering whole the outer edge of the opening portion. Herewith, the rigidity around the opening portion is effectively improved.

Furthermore, on the cover attaching member, the hook cover capable of covering whole the member opening hole is detachably attached. Because of this, in the case the tow hook is not used, the member opening hole and the tow hook do not expose to outside. Therefore, the appearance of the rear bumper cover is improved. On the other hand, in the case of using the tow hook, it is possible to remove the hook cover and leave the tow hook open from the member opening hole of the cover attaching member.

According to the structure of the rear bumper cover of the present invention, the appearance and rigidity of the rear bumper cover can be improved.

BRIEF DESCRIPTION OF THE DRAWINGS

A more complete appreciation of the invention and many of the attendant advantages thereof will become readily apparent with reference to the following detailed description, particularly when considered in conjunction with the companying drawings, in which.

DESCRIPTION OF THE PREFERRED EMBODIMENTS

Figure 1:
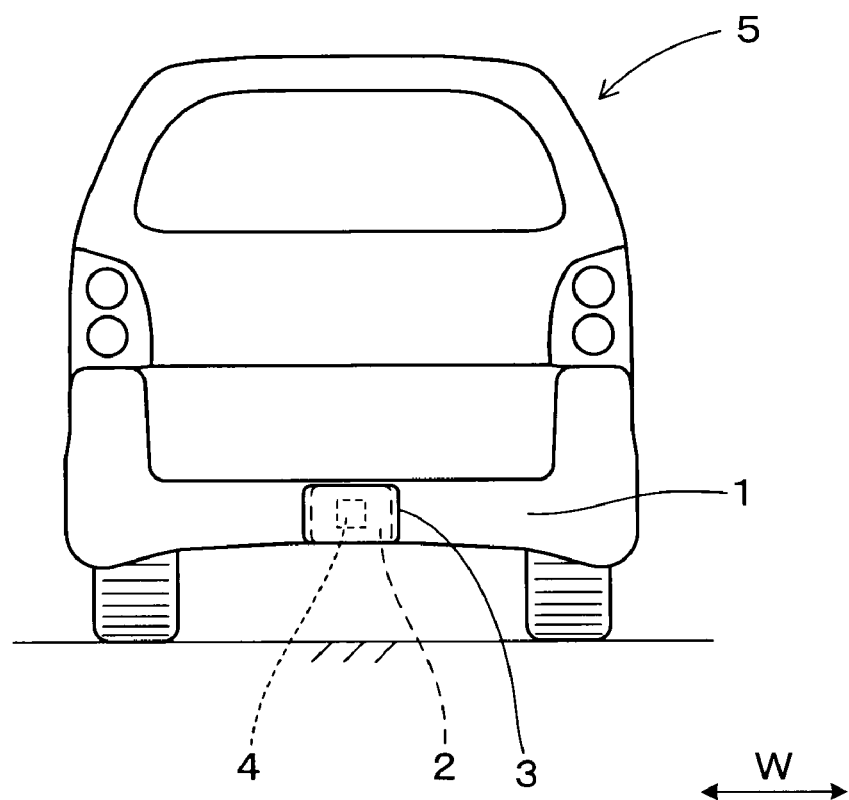
FIG. 1 is an explanation drawing showing a rear bumper cover attached on backward of a vehicle, as the rear bumper cover is seen from the backward of the vehicle of Example.

Hereinafter, a favorable example of the present invention will be described.

It is preferable that the hook cover has a shape which covers approximately whole the cover attaching member.

In this case, it is possible to improve the appearance of the rear bumper cover more.

It is preferable that a structure of a rear bumper cover according to Claim 1 or Claim 2, wherein in a neighborhood of a top edge in a rear surface of the hook cover, an inserting piece for being inserted into an inserted hole disposed on the cover attaching member is disposed, in the bottom edge of the hook cover, an elastic deformation nail for engaging by conducting elastic deformation to a locking hole disposed on the cover attaching member is disposed, and the hook cover is configured to be turned the bottom edge of the hook cover with the supporting point of the inserting piece with the state of inserting the inserting piece into the inserted hole, and to be able to engage the elastic deformation nail to the locking hole by elastically deforming the elastic deformation nail.

In this case, it is possible to easily put on and take off the hook cover to the cover attaching member.

EXAMPLE

Hereinafter, a favorable example of the structure of the rear bumper cover of the present invention will be described with reference to Figures.

The structure of the rear bumper cover of the present example, as shown in FIG. 1-FIG. 4, is composed of an opening portion 11 at the position of a tow hook 4 (towing hitch) at a rear bumper cover 1 made of a resin in backward of a vehicle 5. In this opening portion 11, a cover attaching member 2 made from a resin which forms a member opening hole 21 capable of opening the tow hook 4 is disposed with the state of covering whole the outer edge of the member opening hole 21. Moreover, in the cover attaching member 2, a hook cover 3 capable of covering whole the member opening hole 21 is detachably attached.

Figure 2:
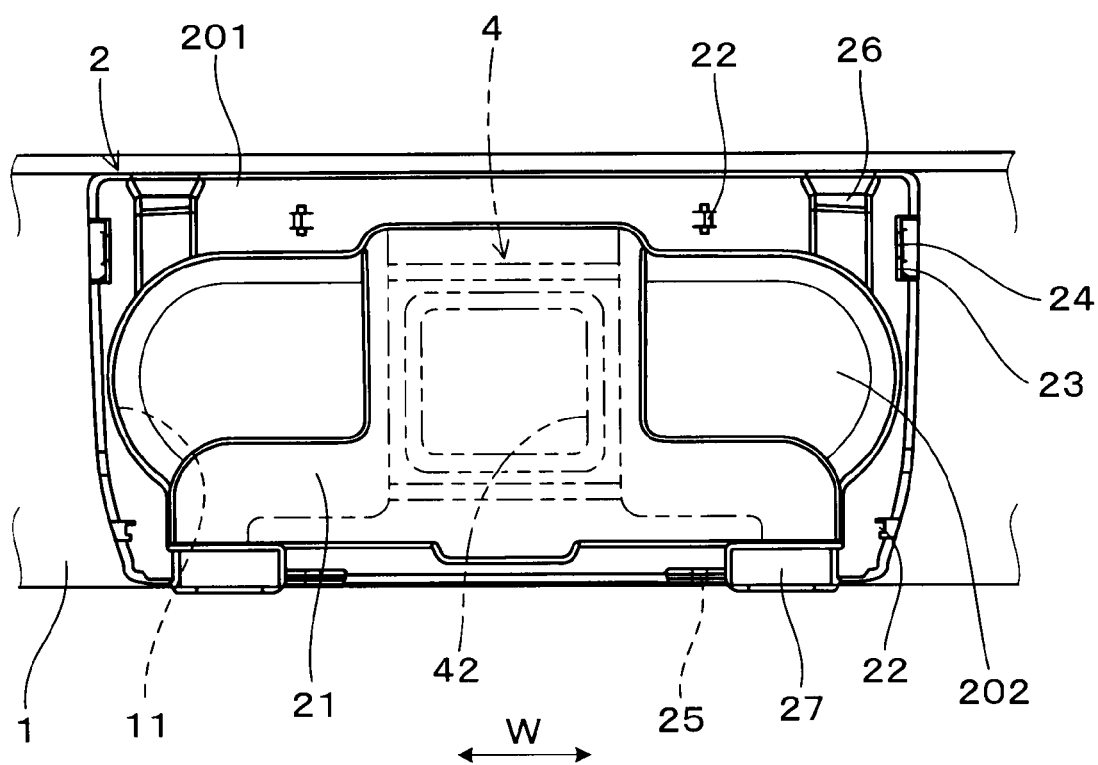
FIG. 2 is an explanation drawing showing a hook cover which is removed from a cover attaching member, as the hook cover is seen from the backward of the vehicle of Example.
Figure 3:
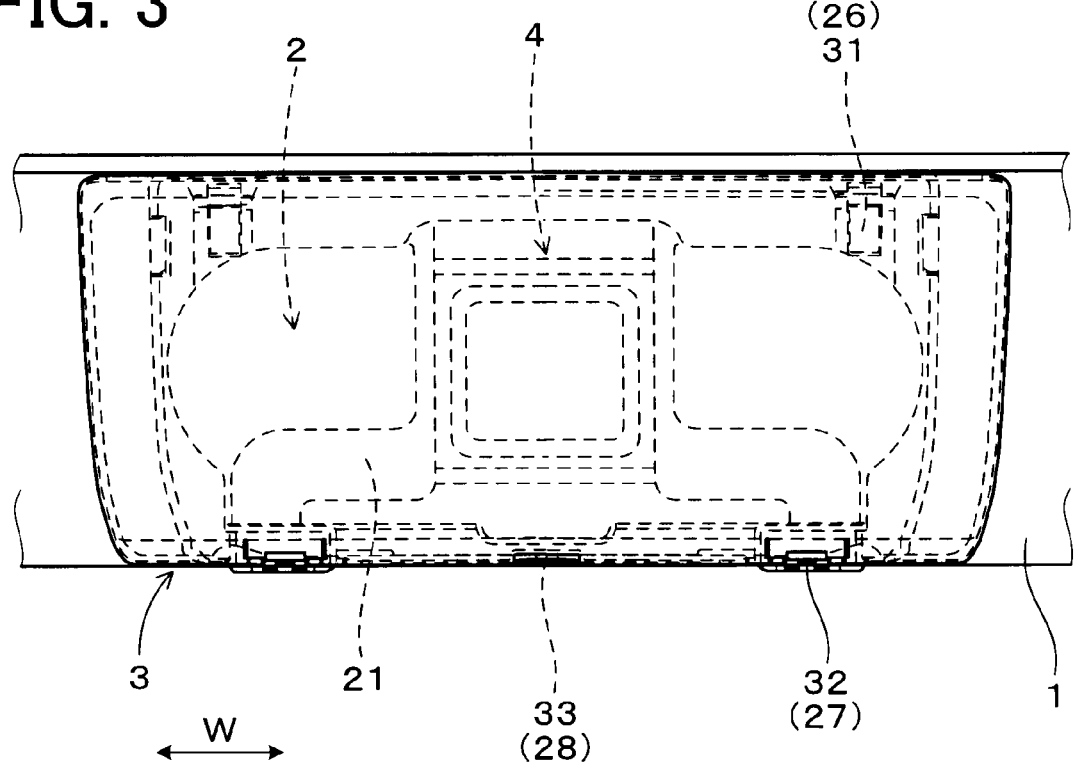
FIG. 3 is an explanation drawing showing the hook cover which is attached on the cover attaching member, as the hook cover is seen from the backward of the vehicle of Example.
Figure 4:
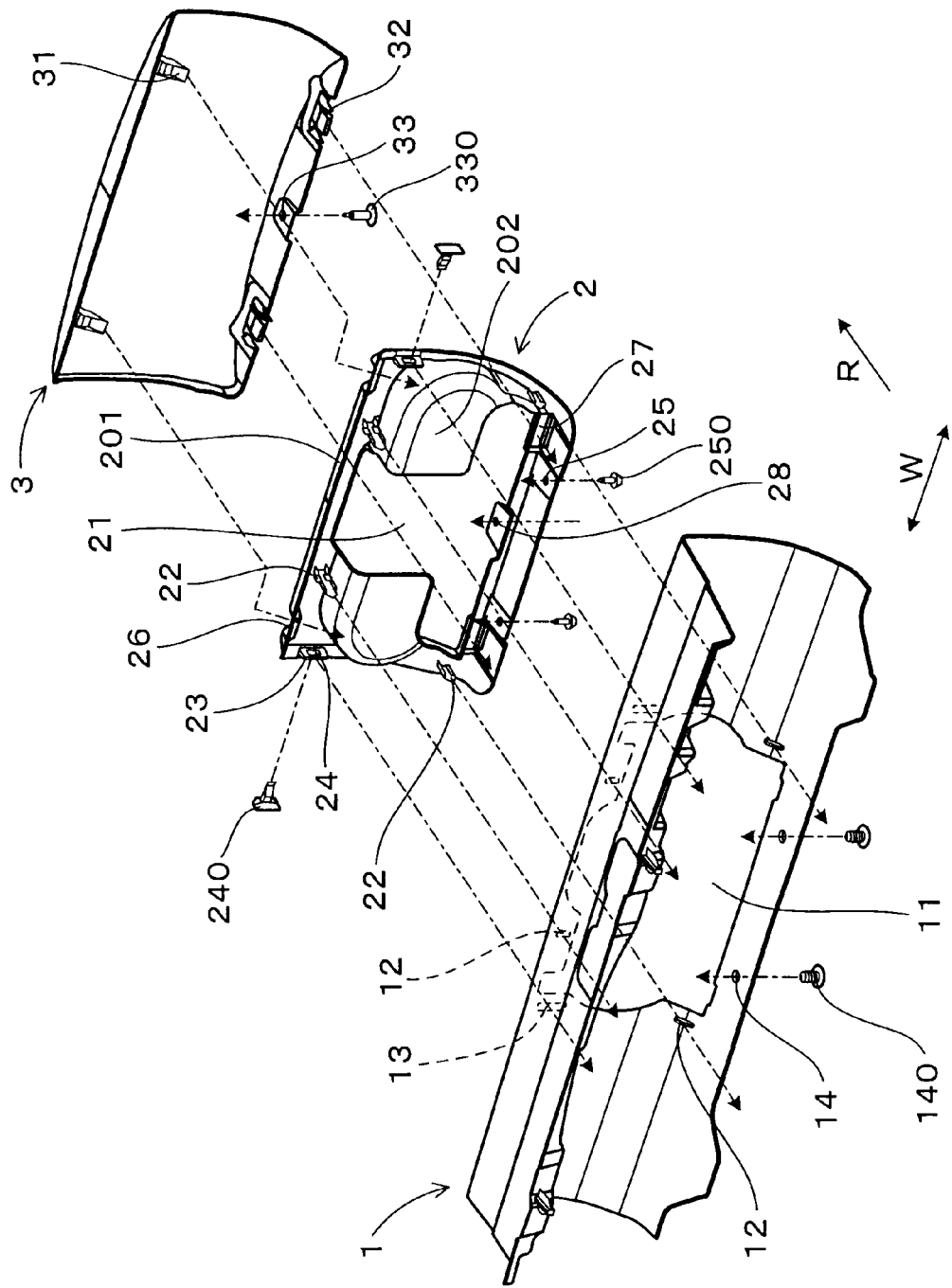
FIG. 4 is a perspective view showing a previous state of attaching the rear bumper cover, cover attaching member, and hook cover of Example.

FIG. 1 shows the rear bumper cover 1 which is attached on the backward of a vehicle. FIG. 2 shows the hook cover 3 which is taken off from the cover attaching member 2, and FIG. 3 shows the hook cover 3 which is attached on the cover attaching member 2. FIG. 4 shows a state before the rear bumper cover 1, the cover attaching member 2, and hook cover 3 are attached.

Hereinafter, the structure of the rear bumper cover 1 of the present invention will be described with reference to FIGS. 1-10.

In FIG. 1-FIG. 10, horizontal direction of the vehicle 5 is indicated by arrow W, and the backward of the vehicle 5 is indicated by arrow R.

As shown in FIG. 1, the vehicle 5 employing the rear bumper cover 1 of the present example is a passenger automobile. The opening portion 11 of the present example is formed at a center location of horizontal direction W in the rear bumper cover 1, and the rear bumper cover 1 is composed of opening the tow hook 4 at the center location of horizontal direction W.

As shown in FIG. 4, the opening portion 11 in the rear bumper cover 1 is formed by conducting a process after the rear bumper cover 1 is molded. The rear bumper cover 1 having the opening portion 11 of the present example shares the parts with the rear bumper cover which does not have opening portion 11 (There is no tow hook 4 at the position of attachment of the rear bumper cover 1.).

Figure 5:
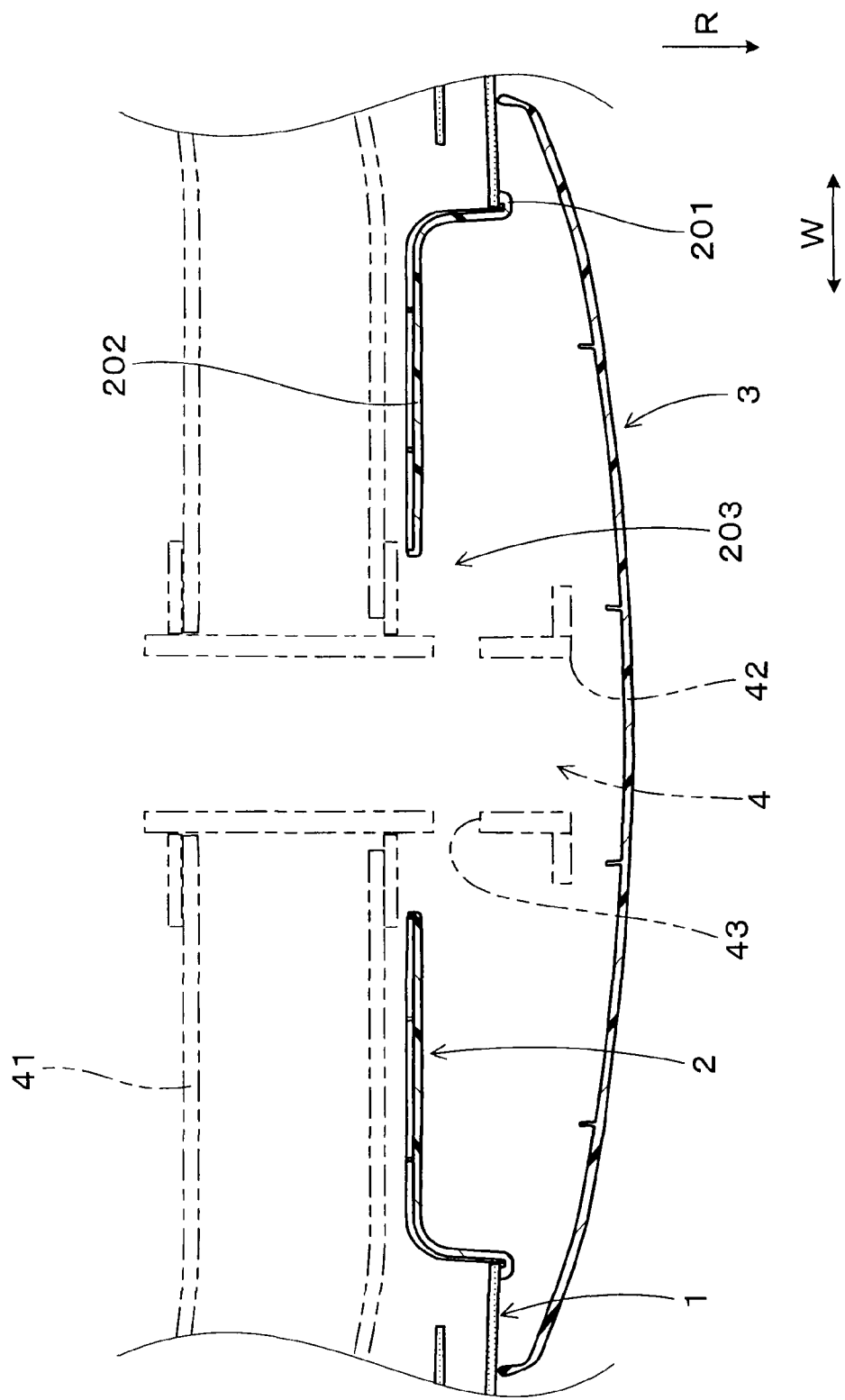
FIG. 5 is a sectional explanation drawing showing the hook cover which is attached on the cover attaching member, as the hook cover is seen from the above of the vehicle of Example.

As shown in FIG. 5, the tow hook 4 is disposed at the center location of horizontal direction W of a frame 41 which is bridged right and left of the vehicle 5. On the tow hook 4, a tow hole 42 which opens to the backward of the vehicle 5 and a hole for pin 43 which is inserted by a pin in order to prevent from falling off a tow bar inserted into the tow hole 42 are formed.

As shown in FIG. 4, the cover attaching member 2 is attached on the opening portion 11 of the rear bumper cover 1 by engaging a engaging nail 22 to a engaging hole 12 which is disposed on the rear bumper cover 1, and using a clip member 330 and a bolt member 240 or the like.

Figure 6:
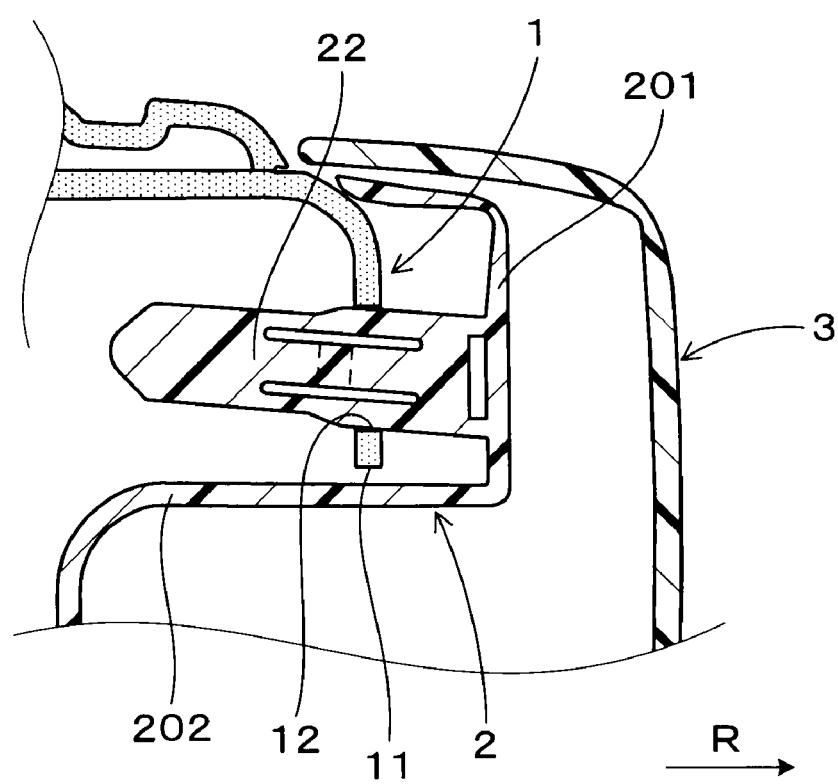
FIG. 6 is a sectional explanation drawing showing the state of inserting an engaging nail of the cover attaching member into a engaging hole of the rear bumper cover, as the state is seen from side of the vehicle of Example.

To be more precise, on either side of the neighborhood of the top edge and bottom edge in the rear surface of the cover attaching member 2, there is the engaging nail 22 engaging to the engaging hole 12 which is disposed on the rear bumper cover 1. As shown in FIG. 6, this engaging nail 22 can be elastically deformed, and it is composed of engaging on the peripheral border of the engaging hole 12 with the state of inserting into the engaging hole 12.

Figure 7:
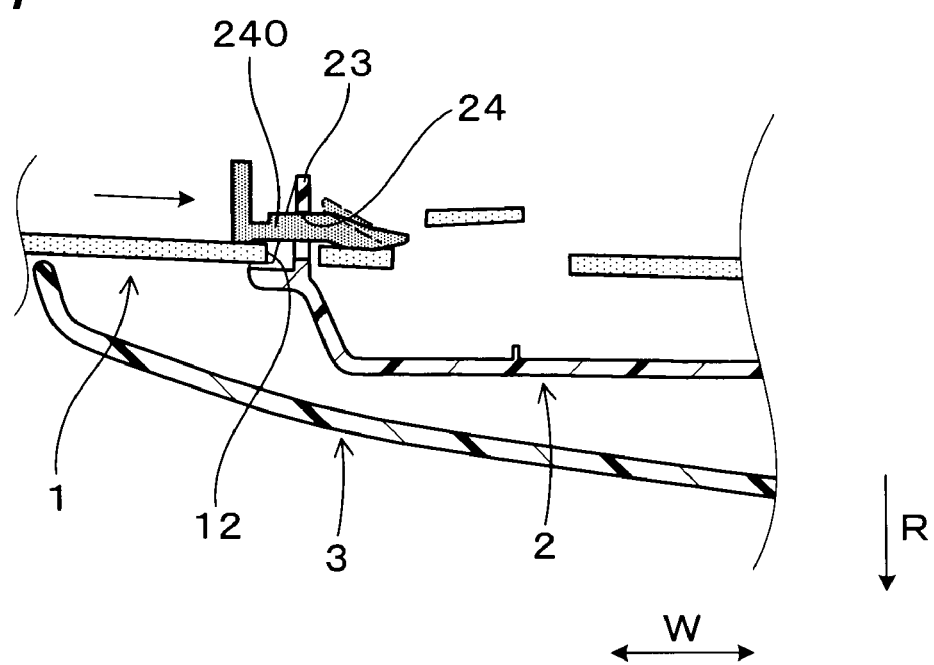
FIG. 7 is a sectional explanation drawing showing the state of inserting a bolt member into a hole for bolt in a protruding portion of the cover attaching member, as the state is seen from the above of the vehicle of Example.

As shown in FIG. 4 and FIG. 7, on either side of the neighborhood of the top edge in the rear surface of the cover attaching member 2, a protrusion portion 23 having a hole for bolt 24 in order to insert the bolt member 240 is formed. With the state of inserting the protrusion portion 23 into a hole for protrusion 13 formed on the rear bumper cover 1, the bolt member 240 is inserted into the hole for bolt 24 in the protrusion portion 23 and a bolt member 240 is engaged to peripheral border of the hole for bolt 24, so that the top edge of the cover attaching member 2 is fixed on the top edge of the rear bumper cover 1.

As shown in FIG. 4, on either side of the bottom edge of the rear bumper cover 1, a hole for grommet 14 attaching a grommet 140 is formed in order to screw a screw 250 together. In the bottom edge of the cover attaching member 2, a penetration hole 25 for penetrating and disposing the screw 250 is formed at the opposed position of the hole for grommet 14. Then, the grommet 140 is attached to the hole for grommet 14 of the rear bumper cover 1 and the screw 250 is screwed together the grommet 140 through the penetration hole 25 from the surface of the cover attaching member 2, so that the bottom edge of the cover attaching member 2 is fixed on the bottom edge of the rear bumper cover 1.

As shown in FIG. 2, FIG. 4 and FIG. 5, the cover attaching member 2 has a peripheral border part 201 disposed on the surface of the rear bumper cover 1 and right and left protrusion parts 202 which is formed to protrude to the forward of the vehicle from the rear surface of this peripheral border part 201. The protrusion parts 202 of right and left are disposed along the shape of the opening portion 11, when the worker connects a tow bar to the tow hook 4, it is protrudes to forward of the vehicle with making a space 203 in which a pin is able to be inserted into the hole for the pin 43.

In addition, by disposing right and left protrusion parts 202 in the opening portion 11, it is possible to effectively enhance the rigidity of periphery of the opening portion 11 of the rear bumper cover 1.

Figure 8:
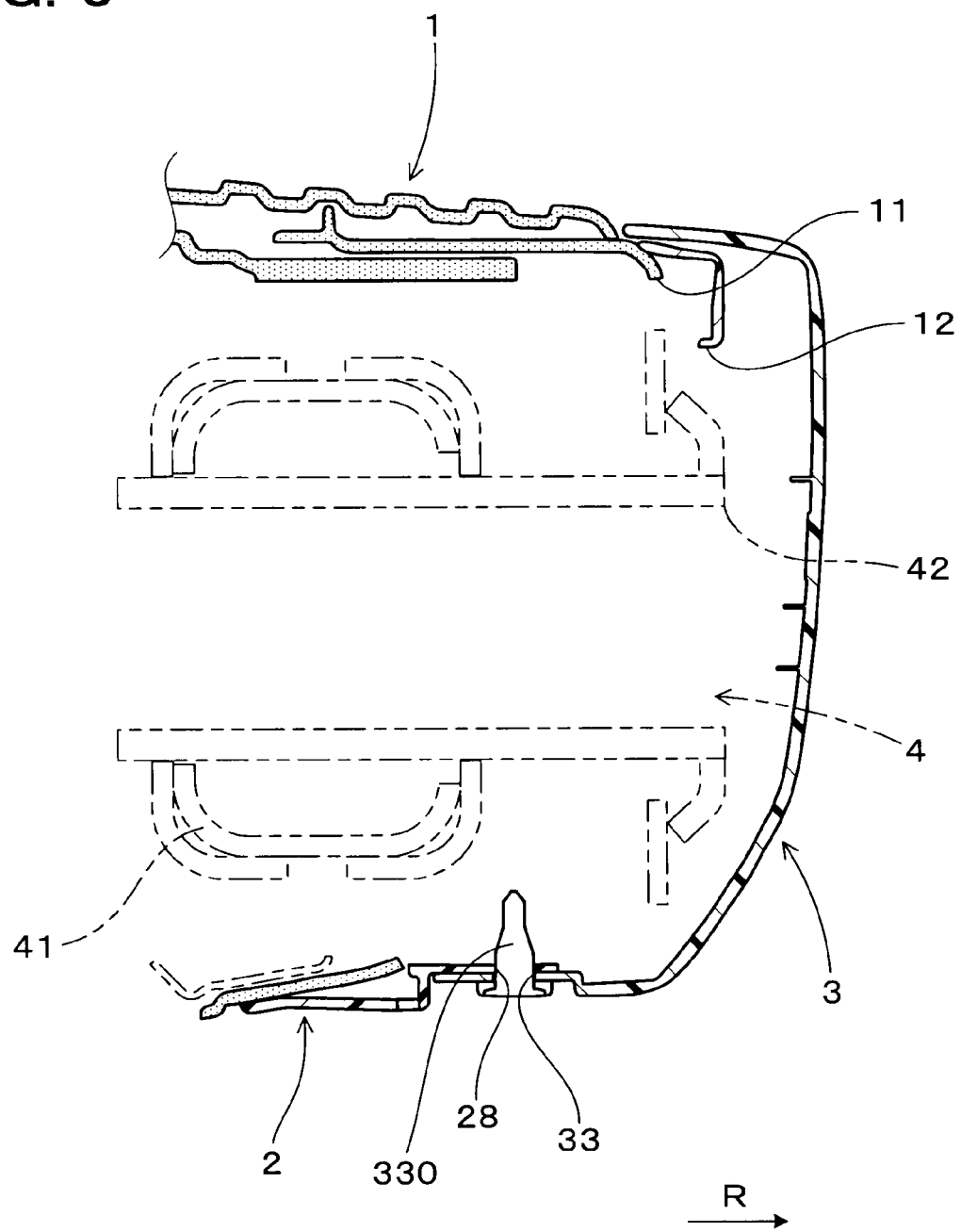
FIG. 8 is a sectional explanation drawing showing the state that the hook cover is attached on the cover attaching member, as the state is seen from the side of the vehicle of Example.
Figure 9:
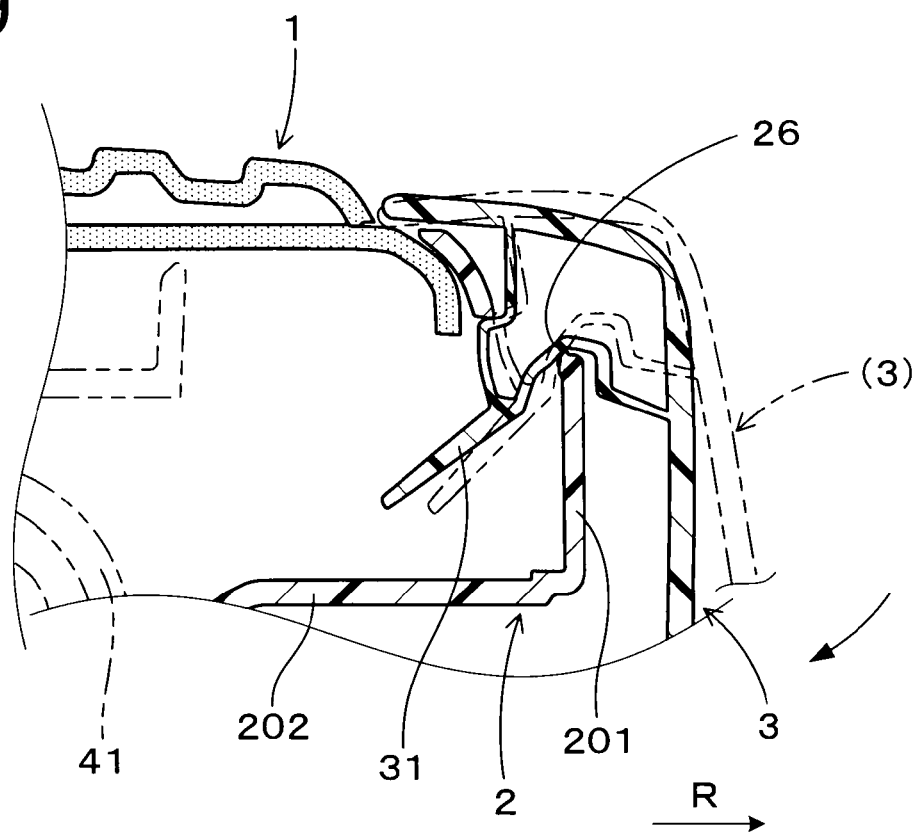
FIG. 9 is a sectional explanation drawing showing the state of inserting an insertion piece of the hook cover into a insertion hole of the cover attaching member, as the state is seen from the side of the vehicle of Example.
Figure 10:
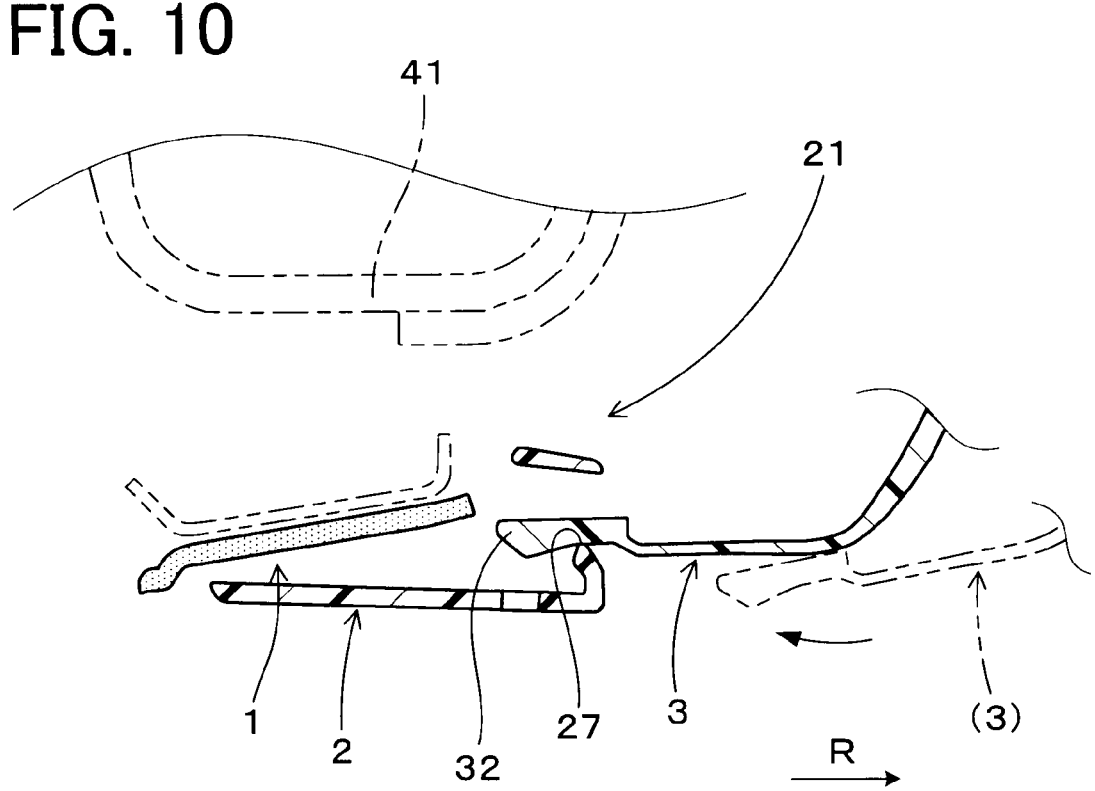
FIG. 10 is a sectional explanation drawing showing the state of engaging an elastic deformation nail of the hook cover with a locking hole of the cover attaching member, as the state is seen from the side of the vehicle of Example.

As shown in FIG. 3, FIG. 5 and FIG. 8, the hook cover 3 has a shape which covers approximately whole the cover attaching member 2. In addition, as shown in FIG. 9, in right and left of the top edge in the rear surface of the hook cover 3, an inserting piece 31 for being inserted into an inserted hole 26 disposed on right and left of the top edge of the cover attaching member 2 is disposed. As shown in FIG. 10, in right and left of the bottom edge of the hook cover 3, an elastic deformation nail 32 for engaging by conducting elastic deformation to a locking hole 27 disposed on the right and left of the bottom edge of the cover attaching member 2 is disposed.

Moreover, as shown in FIG. 9 and FIG. 10, the hook cover 3 is turned the bottom edge of the hook cover 3 with the supporting point of the inserting piece 31 with the state of inserting the inserting piece 31 into the inserted hole 26, and to be able to engage the elastic deformation nail 32 to the locking hole 27 by elastically deforming the elastic deformation nail 32.

In addition, as shown in FIG. 8, at the center location in horizontal direction W of the bottom edge of the cover attaching member 2 and the hook cover 3, holes for clip 28 and 33 in order to intrude the clip member 330 continuously are formed.

The hook cover 3 attached to the cover attaching member 2 is attached by the inserting piece 31 and the elastic deformation nail 32, and it is prevented from falling off by the clip member 330. Moreover, when the tow hook 4 is used, the clip member 330 is removed and engaging state of the elastic deformation nail 32 is released, thereby the hook cover 3 is easily removed from the cover attaching member 2 (refer to FIG. 4).

In the structure of the rear bumper cover 1 of the present invention, cover attaching member 2 made from a resin is disposed on the opening portion 11 formed in the rear bumper cover 1 made from a resin. The cover attaching member 2 is disposed with the state that a peripheral border part 201 covers whole outer edge of the opening portion 11 and the protrusion parts 202 is disposed in the opening portion 11. Herewith, the rigidity around the opening portion 11 is effectively improved.

Furthermore, on the cover attaching member 2, a hook cover 3 capable of covering whole the cover attaching member 2 is detachably attached. Because of this, in the case the tow hook 4 is not used, the member opening hole 21 and the tow hook 4 do not expose to outside. Therefore, the appearance of the rear bumper cover 1 is improved. On the other hand, in the case of using the tow hook 4, it is possible to remove the hook cover 3 and leave the tow hook 4 open from the member opening hole 21 of the cover attaching member 2.

Therefore, according to the structure of the rear bumper cover 1 of the present invention, the appearance and rigidity of the rear bumper cover can be improved.

Obviously, numerous modifications and variations of the present invention are possible in light of the above teachings. It is therefore to be understood that, within the scope of the appended claims, the invention may be practiced otherwise than as specifically described here.

What is claimed is:

1. A structure of a rear bumper cover made from a resin, disposed in a backend part of a vehicle, and including an opening portion formed at a position of a tow hook, the structure comprising:
    a cover attaching member made from a resin having a member opening hole that leaves the tow hook open such that the tow hook is configured to extend through the member opening hole when the tow hook is in use or not in use, the cover attaching member disposed on the opening portion of the rear bumper cover and covering an entire outer edge of the opening portion; and
    a hook cover that covers completely the member opening hole, the hook cover detachably attached on the cover attaching member.

2. The structure of a rear bumper cover according to claim 1, wherein the hook cover has a shape which covers approximately the entire cover attaching member.

3. The structure of a rear bumper cover according to claim 1, wherein
    a top edge of a rear surface of the hook cover includes an inserting piece configured to be inserted into an inserted hole disposed on the cover attaching member,
    wherein a bottom edge of the hook cover includes an elastic deformation nail configured to engage by elastic deformation with a locking hole disposed on the cover attaching member, and
    wherein the hook cover is configured to be turned such that the bottom edge of the hook cover, with the supporting point of the inserting piece in a state of being inserted into the inserted hole, is able to engage the elastic deformation nail to the locking hole by elastically deforming the elastic deformation nail.

4. The structure of a rear bumper according to claim 1, wherein a portion of the cover attaching member extends beyond an engaging surface of the rear bumper in an attaching direction of the cover attaching member.

5. The structure of a rear bumper according to claim 1, wherein the tow hook is configured to extend beyond a plane formed by the member opening hole.

6. The structure of a rear bumper according to claim 1, wherein an end of the tow hook in the backend direction of the vehicle is disposed between a plane formed by the member opening hole and an outer surface of the hook cover.

* * * * *